United States Patent [19]

Knapman

[11] Patent Number: 4,531,186
[45] Date of Patent: Jul. 23, 1985

[54] USER FRIENDLY DATA BASE ACCESS

[75] Inventor: John M. Knapman, Richardson, Tex.

[73] Assignee: International Business Machines Corporation, Armonk, N.Y.

[21] Appl. No.: 459,792

[22] Filed: Jan. 21, 1983

[51] Int. Cl.³ .......................... G06F 7/00; G06F 9/06
[52] U.S. Cl. ..................................................... 364/300
[58] Field of Search ... 364/200 MS File, 900 MS File, 364/300 MS File

[56] References Cited

U.S. PATENT DOCUMENTS

| 4,042,912 | 8/1977 | Bachman et al. | 364/200 |
| 4,044,334 | 8/1977 | Bachman et al. | 364/200 |
| 4,205,371 | 5/1980 | Feather | 364/200 |
| 4,422,158 | 12/1983 | Galie | 364/900 |
| 4,445,171 | 4/1984 | Neches | 364/200 |

OTHER PUBLICATIONS

"An Introduction to Data Base Systems", by C. J. Date, vol. 1, Third Ed., Addison-Wesley, 1982.

Primary Examiner—Raulfe B. Zache
Assistant Examiner—William G. Niessen
Attorney, Agent, or Firm—C. Lamont Whitham; James H. Barksdale; John L. Jackson

[57] ABSTRACT

Data base administrator (10) creates program communication blocks (11), and programmer (12) writes programs (13) using the program communication blocks (PCBs) to store data in bulk storage device (14). A user (15) not having data processing skills or experience is enabled by means of a utility to access data in bulk storage device (14) via the PCBs (11). The utility first reads the data base descriptions (DBDs) and PCB source statements and constructs a data directory, consolidating access paths into entry data bases which are displayed to the user (15) as a menu. The utility then evaluates all possible access paths that will satisfy a user query, weights them according to their efficiency, and selects the best.

6 Claims, 6 Drawing Figures

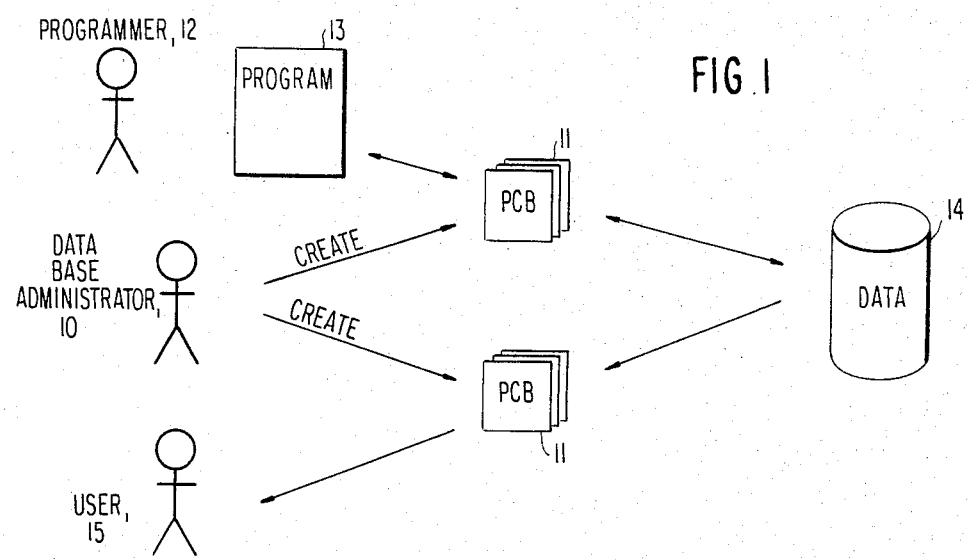
FIG. 1
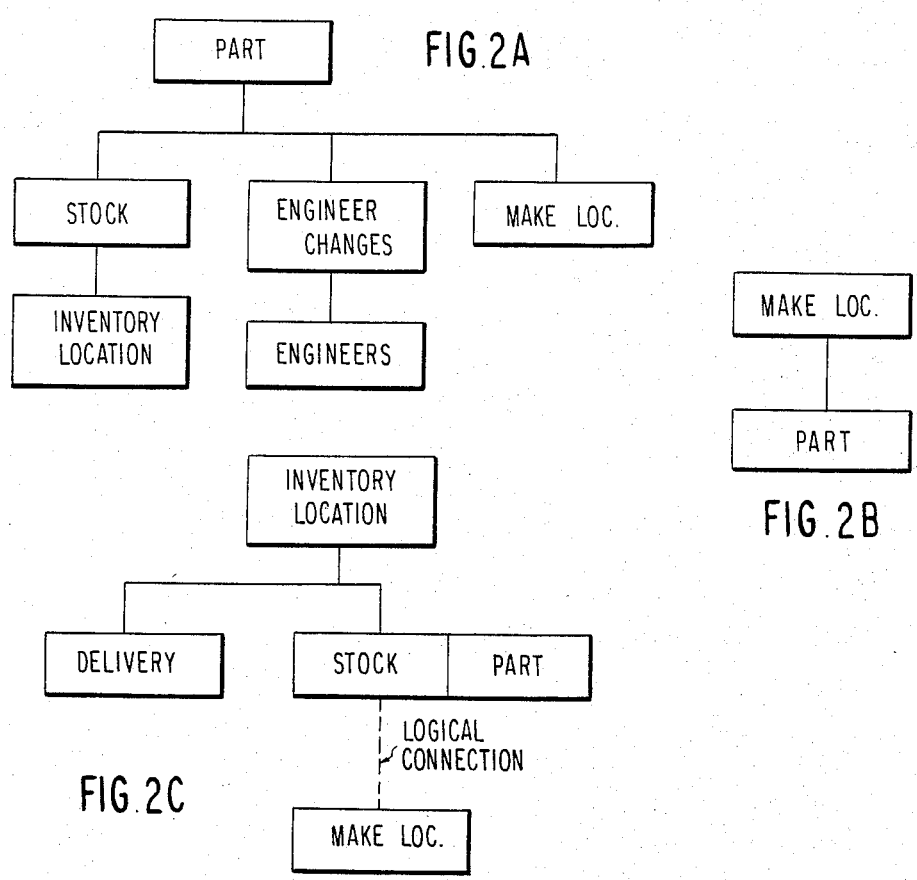
FIG. 2A
FIG. 2B
FIG. 2C

USER FRIENDLY DATA BASE ACCESS

DESCRIPTION

1. Technical Field

This invention relates to a data base management system, and more particularly to an improvement in the system which allows a user without data processing skills or experience to easily access data in the data base with the aid of a user-friendly menu.

2. Background Art

Data Language I (DL/I) is a data processing language developed by the International Business Machines Corp. for data processing applications. DL/I uses program communication blocks (PCBs) as a means of controlling both storing and accessing data in bulk storage. FIG. 1 of the drawings illustrates the functional application of DL/I. A data base administrator 10 creates the PCBs 11, the number and character of which vary depending on end user requirements. PCBs may be added or updated on a periodic basis by the data base administrator. A programmer 12 writes a program or programs 13 which use the PCBs to store or access data in a bulk storage device 14, such as a disk pack.

As a specific illustrative example, assume that the business for which the system is designed is a manufacturer of parts for appliances. FIGS. 2A, 2B and 2C illustrate in simplified form three of many PCBs that might be generated by the data base administrator for this business. In FIG. 2A, the hierarchy of the PCB begins with the part identification which may typically be an alphanumeric character. From the part identification, it is possible to access information on the inventory or stock on hand, engineering change notices that may have been generated for that stock number, and the location or locations where the parts are manufactured. Taking it one step further, in addition to inventory, it is also possible with this PCB to access information on the location of the inventory, and in addition to the engineering change notices, it is also possible to determine the engineers who wrote the change notices. Some of this information may be protected and not accessible by all users, and while restricted access is a feature of DL/I, it is not germane to the subject invention and therefore will not be discussed further. Still with reference to FIG. 2A, it will be appreciated that the PCB is an indexing scheme. Each level of that scheme is referred to as a segment.

FIG. 2B shows another PCB, this one beginning with place of manufacture and leading to the part identification. In other words, with this PCB it is possible to determine what parts are being manufactured at each location. For a small business, the place of manufacture may be a machine tool station within the plant and for a large business, it may be a different geographical location altogether. The PCB shown in FIG. 2B can be considered to be an inverted subset of the PCB of FIG. 2A. The third example of a PCB is shown in FIG. 2C which begins with inventory location from which it is possible to access information about both the stock on hand and the corresponding part identification. In addition, it is possible to access delivery information such as scheduling, destination and carrier. Other PCBs might typically include personnel records allowing access to shift assignments, vacation schedules and the like.

A number of people within the business may have need to access the data base. The plant manager will need to know inventory levels and orders to determine what and how many parts to make. The plant foreman will need to know what the level of activity is at each manufacturing location to determine when machines can be shut down for maintenance and when a machine operator can have time off. A query posed by the user of the data base management system usually requires more than one of the PCBs in order to access the information. It is therefore the responsibility of the programmer to write programs which anticipate the queries that may be posed by any of a variety of users of the data base management system. Obviously, the programmer can not anticipate all possible queries, and when a user wants access to information in a manner not provided for by the existing programs, it is necessary to have the programmer write a new program that will accomodate the user's query. This can be both expensive and time consuming and in the case of time sensitive information, may provide no solution at all.

SUMMARY OF THE INVENTION

It is therefore an object of the present invention to provide an improved data base management system which allows a user to easily access data even though a specific program has not been written using the PCBs required for the data access.

The subject invention accomplishes this by first automatically displaying a data directory of entry data bases and then in response to a specific query, automatically selecting the best access path to an item. More specifically, the invention is a utility that first reads the DL/I data base descriptions (DBDs) and PCB source statements and constructs a data directory, consolidating access paths into entry data bases. An entry data base consists of a single hierarchical structure that shows every physical and logical path accessible from one physical root segment which is the entry point. The name of the entry data base is the name of the physical data base containing the root segment. Duplicate logical and physical paths are consolidated, but concatenated segments and any dependents are treated as being distinct from their component segments. The entry data base is displayed to the query user as a menu. The query user need not distinguish between physical and logical data bases in DL/I.

When a selection criterion in a query refers to a field that has a DL/I secondary index, the DL/I hierarchical structure and PCB to be used are different from the usual case. Similarly, when a query refers to the key of a logical parent, a different structure and PCB must be used. The invention hides these problems from the query user, who may not understand them, by evaluating all possible access paths to the DL/I segments to be retrieved in a query. The invention then selects the optimum path, based on weighted priorities. The DL/I retrieval pattern is then adjusted to the new hierarchy.

BRIEF DESCRIPTION OF THE DRAWINGS

FIG. 1 is a pictorial illustration of the functional application of DL/I and the improvement according to the present invention.

FIGS. 2A, 2B and 2C are simplified illustrations of three PCBs that might be generated for a parts manufacturing business.

DESCRIPTION OF A PREFERRED EMBODIMENT

Referring again to FIG. 1, the subject invention now allows a user 15 not having data processing skills or experience to access data in bulk storage 14 via PCBs 11. This is accomplished automatically with a utility in two operations. The utility allows both logical and physical connection of the PCBs in order to access information in response to the user query. The physical connection of the segments is implicit in the PCBs illustrated in FIGS. 2A and 2B. FIG. 2C illustrates a logical connection. In this PCB, the place of manufacture is not physically connected to the stock/part identification segment; rather, it is logically connected to that segment. This logical connection makes possible a connection to other PCBs such as for example the PCB shown in FIG. 2A. In this way, a number of paths may be constructed to access the desired information in response to a user query.

In the first operation, the utility reads the DL/I physical data base description (DBD), the logical DBD and the PCB source statements, all of which are also used by DL/I. Using this information, the utility constructs a data directory and consolidates the several possible access paths into entry data bases. The next operation is performed on-line. The utility evaluates all possible access paths that will satisfy a query, weights them according to their efficiency, and selects the best.

Figure 3:
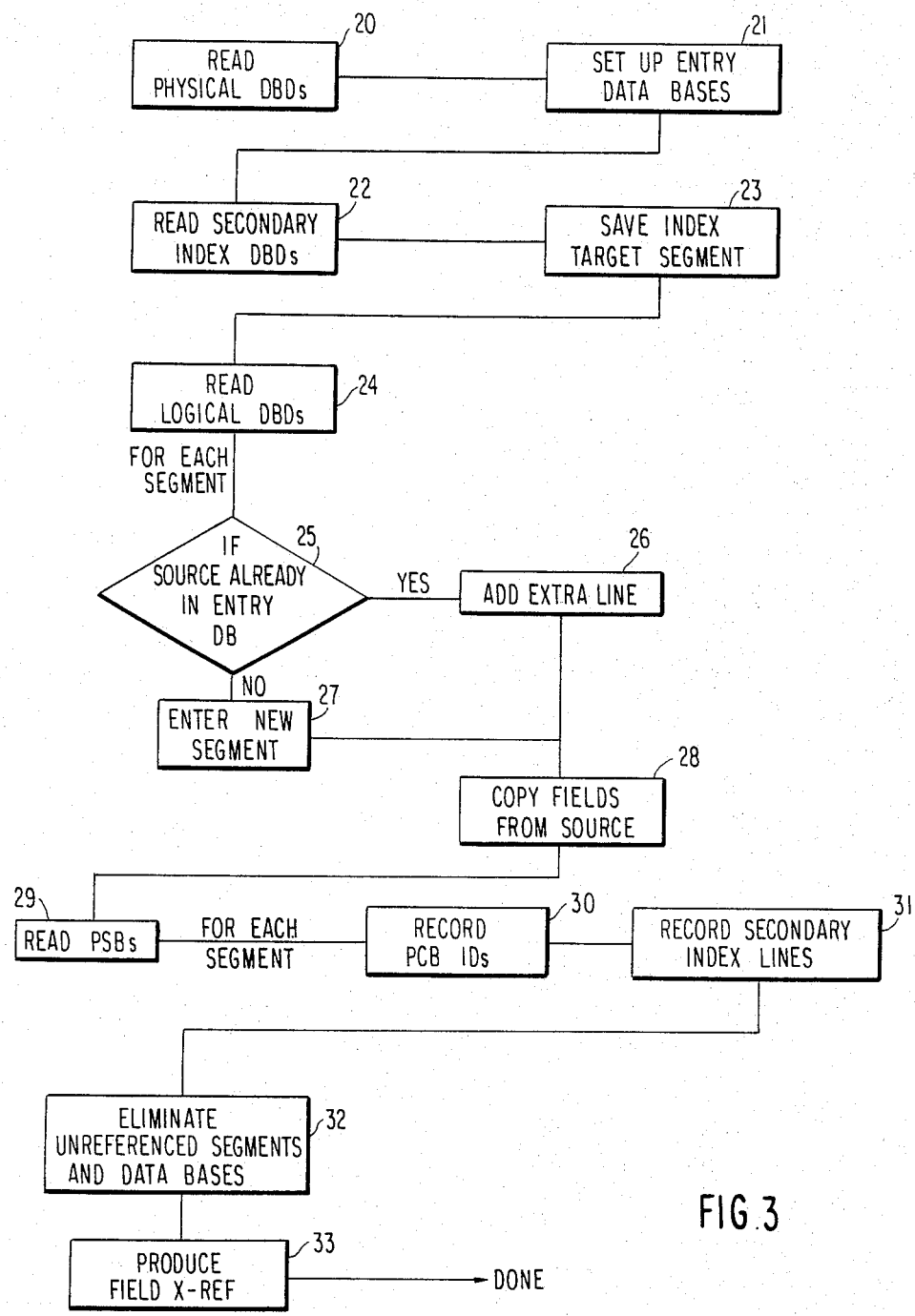
FIG. 3 is a flow diagram for producing the entry data base according to the invention.

The first operation performed by the utility is illustrated by the flow diagram of FIG. 3. In the first step represented by block 20, all physical DBDs are read and then in block 21, one entry data base is set up per each physical DBD. An entry data base is described by a member (a named major item) in the data directory. Each segment and field is described by a line in a member.

The next step in block 22 is to read all secondary index DBDs, locating the indexed fields in the entry data base members and in block 23, saving the index target segment against the definition of the indexed field. In block 24, all logical DBDs are read and the physical source entry data base for each one is located. By this is meant that the physical data base whose root is the source of the root of the logical data base is located.

The utility now must make a decision as represented by decision block 25. For each segment in the logical DBD, its source may or may not be in the entry data base. If it is, an extra line is added following the physical segment line as indicated in block 26. Otherwise, a new segment is entered at the correct hierarchical position as indicated in block 27. Two segments with a common source are treated together, with two successive lines. Concatenated segments are treated as distinct from their two parts. For every logical segment so added, the source segment in another entry data base is found, and the fields are copied from there as indicated by block 28.

Next in block 29, all program specification blocks (PSBs; a PSB contains several PCBs) and the data base PCBs that they contain are read to find the entry data base and segments to which each one refers. Then in block 30, the PCB identification is recorded against each segment. The PCB identification is the PSB name plus the PCB number. If several PCBs reference one segment, either physical or logical, new segment lines are created, one per segment and PCB. If a PCB uses a secondary processing sequence (secondary index), that fact is recorded in a segment PCB line and the PCB identification is recorded against the indexed field as indicated by block 31.

At this point, all entry data bases are scanned and those segments referenced by no PCBs and those entry data bases containing no referenced segments are eliminated as indicated by block 32. Finally, a set of field cross-reference members is produced, one member for every field in the data directory as indicated by block 33. Each member produced shows every entry data base, segment and PCB identification by which the field can be found.

Figure 4:
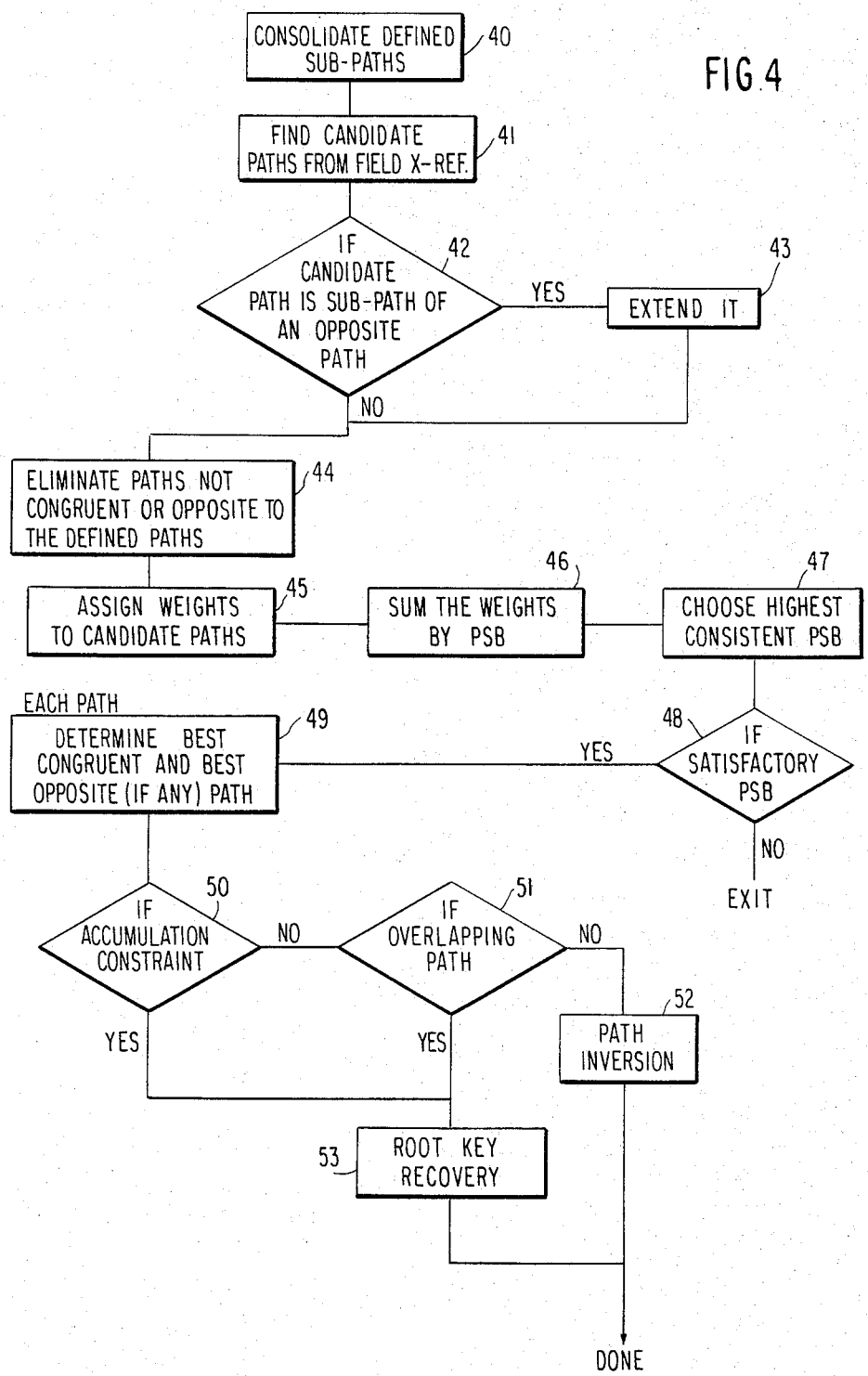
FIG. 4 is a flow diagram for making the PCB selection in the data base query according to the invention.

The second operation performed by the utility is shown in FIG. 4, but before proceeding with a discussion of that figure, certain definitions must be made. The invention provides menus to enable a user to select entry data bases, segments and fields. When the user identifies a segment, he identifies the first of a set of equivalent segments placed together in the entry data base operation described above. Each of these equivalent segments is identified internally by segment name and PCB identification. In fact, this combination defines a path of segments from the root to the named segment. If two segment name/PCB identification combinations are equivalent in this way, the defined paths are said to be congruent.

A sub-path of a path has the same PCB identification and the same segment names, from the root down, as the path but is shorter. Two paths are said to overlap if there exists a sub-path common to both of them.

If the paths share a common physical source throughout, but their corresponding segments are in the opposite order, they are said to be opposite. For the purposes of this definition, (a) all fields used in one path must be present in the other, (b) paired segments are considered to be the same unless their logical parent is the same as their physical parent, and (c) one or both of the paths can be in a secondary data structure associated with a secondary index. This relationship between paths is paramount. Any logical path or secondary index path, to be useful for accessing efficiency, must have its root key field identified by the user in a selection criterion. If, therefore, the user has identified its root key, the identified path will contain a segment sourced on that root segment; otherwise, it will not.

Turning now to FIG. 4, in block 40, for each segment identified by the user, the defined path is considered and each sub-path so defined is consolidated into the longest path. Then in block 41, for each field identified by the user, all possible access paths are found using the field cross-reference members. These are the candidate paths. Then in decision block 42, if a candidate path is not opposite but is a sub-path of an opposite path, it is extended to be opposite as indicated in block 43; otherwise, it is not. All candidate paths except for those that are either congruent or opposite to a path identified by the user are eliminated as indicated by block 44.

At this point in the operation, for each identified path, all candidates are considered congruent or opposite. In block 45, weights are assigned to each candidate depending on whether it uses a primary physical key, primary logical key or secondary index with an equality or range relationship. Next, in priority is congruence over oppositeness. Finally, weight is given to the identified path above the other candidates. Each of the above factors is give half as much weight as its predecessor.

To select a PSB, the weights accorded to the candidate paths contained in each PSB are summed in block 46 and in block 47, the highest PSB is chosen. All candidates not in this PSB are eliminated. In block 47, a consistency check is performed to ensure that any paths identified as overlapping still overlap with the chosen PSB; if not, that PSB is rejected and the next best is taken. The user is notified if no satisfactory PSB is available and processing terminates at decision block 48.

For each identified path, the single best congruent path and the single best opposite (if any) path are determined as indicated in block 49. The congruent and identified path can be the same.

If the query, as defined by the user, does not require counting, totaling or other accumulating that depends on the hierarchical order of segments in an identified path, and if that path overlaps no other in the query, then a high priority opposite path will be retrieved instead of the identified path. This is known as "path inversion" and is indicated by the sequence of blocks 50, 51 and 52 in FIG. 4. If one or both of those conditions is false and a high priority opposite path is available, it will be retrieved in order to obtain root keys of the identified path or of the congruent path. These are used to retrieve only those occurrences that can possibly satisfy the selection criteria. This option, less efficient than path inversion, is termed root key recovery and is indicated by block 53. Even though less efficient, it is still far better than a complete search of the data base.

In summary, the invention is an improvement to a data base management system, and this improvement is a utility that reads both physical and logical DBDs and all PCBs to develop a data directory. This data directory describes entry data bases which are displayed as menus on-line to a user. In response to the selection criteria of the user, access paths are determined from the data directory.

I claim:

1. An improvement in a data base management system of the type requiring user specified selection criteria in association with corresponding program communication blocks (PCBs) selection in order to access information in the data base, said improvement being a method for simplifying the user's query task, comprising the steps of:
   constructing a set of entry data bases from definitions of said data bases and PCBs, said entry data bases each consisting of a single hierarchical structure that shows every physical and logical path accessible from one physical root segment with duplicate logical and physical paths being consolidated,
   displaying said entry data bases to the query user as a menu from which segments, fields and PCBs can be selected,
   evaluating all possible access paths to the segments to be retrieved in the user query, and
   selecting the optimum access path according to weighted priorities.

2. The improvement recited in claim 1 wherein the step of constructing entry data bases comprises the steps of:
   reading the physical and logical data base descriptions (DBDs) and the PCB source statements that refer to said data base including secondary indexes,
   setting up one entry data base per physical DBD,
   locating the physical source entry data base for each logical DBD,
   finding the entry data base and segments to which each PCB source statement refers,
   eliminating those segments referenced by no PCBs and those entry data bases containing no referenced segments, and
   producing a set of field cross-reference members for a data directory, each member showing every entry data base, segment and PCB by which the field can be found.

3. The improvement recited in claim 1 wherein the step of evaluating comprises the steps of:
   identifying the candidate paths as all possible access paths for each segment selected by the user, and
   eliminating all candidate paths except for those that are either congruent or opposite to a path identified by the user.

4. The improvement recited in claim 3 wherein the step of selecting comprises the steps of
   assigning a weight to each candidate path depending on the following factors in succession: whether it uses a primary physical key, a primary logical key, or a secondary index, and is congruent, and
   summing the weights accorded to the candidate paths with the program specification block comprising one or more PCBs having the highest weighted sum being chose.

5. The improvement recited in claim 4 wherein the weights assigned decrease by powers of two for each factor in succession.

6. The improvement recited in claim 4 wherein the step of selecting further comprises the steps of:
   performing a consistency check to ensure that any paths identified as overlapping still overlap with a chosen PSB,
   rejecting the chosen PSB and taking the next if an overlap is not found and then for each candidate path determining the best congruent path and the single best opposite (if any) path,
   if the query, as defined by the user, does not require counting, totaling or other accumulating that depends on the hierarchical order of segments in an identified path, and if that path overlaps no other in the query, retrieving a high priority opposite path when available instead of the identified path, but
   if one or both of these conditions is false and a high priority opposite path is available, retrieving said high priority opposite path to obtain root keys of the identified path so that those occurrences that can possibly satisfy the selection criteria can be retrieved.

* * * * *